US012644644B2

(12) United States Patent
O'Connell et al.

(10) Patent No.: US 12,644,644 B2
(45) Date of Patent: Jun. 2, 2026

(54) AIR GAP BOOM COVER SYSTEM AND METHOD FOR DRYING AN INSULATED BOOM SECTION OF AN AERIAL LIFT DEVICE

(71) Applicant: QUANTA ASSOCIATES, L.P., Houston, TX (US)

(72) Inventors: Daniel Neil O'Connell, Surrey (CA); Raymond Henry Jodoin, Surrey (CA)

(73) Assignee: Quanta Associates, L.P., Houston, TX (US)

( * ) Notice: Subject to any disclaimer, the term of this patent is extended or adjusted under 35 U.S.C. 154(b) by 604 days.

(21) Appl. No.: 18/315,695

(22) Filed: May 11, 2023

(65) Prior Publication Data

US 2023/0366621 A1     Nov. 16, 2023

Related U.S. Application Data

(60) Provisional application No. 63/341,078, filed on May 12, 2022.

(30) Foreign Application Priority Data

May 12, 2022     (CA) ................................ CA 3158861

(51) Int. Cl.
*F26B 3/04*          (2006.01)
*B66F 11/04*         (2006.01)
          (Continued)

(52) U.S. Cl.
CPC .............. *F26B 3/04* (2013.01); *B66F 11/044* (2013.01); *B66F 13/00* (2013.01); *B66F 17/006* (2013.01); *H02G 1/02* (2013.01)

(58) Field of Classification Search
CPC .. F26B 3/04; F26B 21/50; F26B 25/12; F26B 21/001; F26B 25/066; B66F 11/044; B66F 13/00; B66F 17/006; H02G 1/02
See application file for complete search history.

(56) References Cited

U.S. PATENT DOCUMENTS 3,997,695 A     12/1976   Gitt et al.
4,877,422 A     10/1989   Walbridge et al.
          (Continued)

FOREIGN PATENT DOCUMENTS

CA          3085287 A1     1/2022
JP          H0753363 Y2    12/1995
WO          2019079605 A1   4/2019

OTHER PUBLICATIONS

IPCalculus, IPCalculus Search Result for "Air Gap Boom Cover", Apr. 15, 2022, 14 pages.
          (Continued)

*Primary Examiner* — David J Laux
(74) *Attorney, Agent, or Firm* — Oathout Law Firm; Antony C. Edwards; Laura Tu

(57)          ABSTRACT
A system for drying an exterior of an insulated boom section of an aerial lift device. The system includes at least one section of a boom cover which encapsulates the insulated boom section when the boom cover is disposed over the exterior of the insulated boom section. The system also includes retainers to releasably retain the boom cover on the insulated boom section. The system further includes spacers to space the boom cover from the exterior of the insulated boom section by an air gap and an inlet to direct air through the air gap and over, along and around the insulated boom section exterior for drying the insulated boom section. A corresponding method is also disclosed.

16 Claims, 20 Drawing Sheets

(51) Int. Cl.
    *B66F 13/00*      (2006.01)
    *B66F 17/00*      (2006.01)
    *H02G 1/02*      (2006.01)

(56) References Cited

U.S. PATENT DOCUMENTS

| | | |
|---|---|---|
| 6,540,473 B2 | 4/2003 | Inokuchi et al. |
| 9,663,334 B2 | 5/2017 | Higgins |
| 9,969,602 B2 | 5/2018 | Chomko |
| 11,958,728 B2* | 4/2024 | Wabnegger ........... B08B 7/0071 |
| 2005/0045355 A1* | 3/2005 | Dubail .................... H02G 1/02 |
| | | 174/5 SB |
| 2019/0112172 A1* | 4/2019 | Wabnegger ............... F26B 3/04 |

OTHER PUBLICATIONS

Rodriquez, Kari, PCT Search Report for PCT/US23/66867, Oct. 5, 2023, 2 pages, ISA/US, Alexandria, Virginia, United States.
Rodriquez, Kari, PCT Written Opinion of the International Searching Authority for PCT/US23/66867, Oct. 5, 2023, 6 pages, ISA/US, Alexandria, Virginia, United States.

\* cited by examiner

AIR GAP BOOM COVER SYSTEM AND METHOD FOR DRYING AN INSULATED BOOM SECTION OF AN AERIAL LIFT DEVICE

FIELD

Embodiments described herein relate to a system employing a boom cover for drying an insulated boom section of an aerial lift device. A corresponding method is also described.

BACKGROUND

Service, repair or maintenance of electrical transmission lines or conductors while they are in an overhead position and in an energized state is common and is usually referred to as live-line work. In one method of live-line work, referred to as "barehand", workers are positioned adjacent a live conductor that needs service, repair or maintenance, and the workers are energized to the same potential as the live conductor while being insulated from the ground. In this method, since the workers are at the same potential as the live conductor, the workers can directly touch and work on the live conductor and its components without harm as long as the workers continue to be insulated from the ground and maintain a required distance from areas of different potentials such as adjacent energized conductors or components of different potential.

In a barehand method, the workers are typically positioned adjacent to the live conductor by an aerial lift device such as a bucket truck 2 shown in FIG. 1. In a typical configuration of a bucket truck and as seen in FIG. 1, the bucket truck 2 includes a boom 4 which is operated and manipulated to position a bucket 6, in which the workers are located, adjacent the live conductor. The boom 4 includes a corona ring C. The boom 4 comprises multiple boom sections, hingedly connected together, for elevation and articulation of the bucket 6. The boom 4 of the bucket truck 2 is also used to insulate the workers from the ground. For this, the insulated boom section 8, namely the upper boom section leading to the bucket 6, is electrically insulative and is made with a dielectric material, usually fiberglass. All the other sections of the boom 4, below the insulated boom section 8, may be conventionally not electrically insulated and are typically made of steel.

As one skilled in the art will understand, even electrically insulating materials will permit some relative quantity of electric current to pass. This relative electric current passing through the insulated boom section 8 is commonly referred to, in the art, as leakage current. For safety of the workers in the bucket 6 and others at the work site, it is critical that the electrically insulative characteristics of the insulated boom section 8 are maintained and are not allowed to degrade. The condition of the insulated boom section maybe tracked by monitoring the leakage current. If degradation is not controlled, a conductive path can form along the insulated boom section sufficient to present a dangerous electrical path from the bucket to the ground. This can prove fatal for the workers in the bucket 6 and others at the work site.

It is known that during use, transportation or storage of the bucket truck, contaminants such as soil, dust or salt tend to deposit on the exterior and interior of the insulated boom section 8. The dry contaminant layer can become conductive under light wetting conditions such as light rain, fog or condensation such as so-called morning dew thereby reducing the electrically insulative characteristics of the insulated boom section 8. To avoid degradation of the electrically insulative characteristics, it is important that the insulated boom section 8 be always kept clean and dry.

Various boom cleaning and drying methods are known, a few of which are discussed in the following paragraphs.

In one known method, the exterior of the insulated boom section is wiped clean of dirt and moisture accumulation. The dirt and moisture on the boom exterior are wiped off using a clean rag and cleaning solvent such as denatured alcohol or other boom cleaners, and the boom exterior is then subsequently wiped with a silicon wiping cloth to repel moisture. Moisture on the interior of the insulated boom section is dried using ambient air. For this, the insulated boom section is raised to a near vertical position and ambient air is allowed to flow up through the interior of the boom to dry the interior. To speed up the process, where possible, the insulated boom section is raised up and warm air is blown up through the interior of the insulated boom section with a hair dryer, leaf blower or similar, to facilitate evaporation of moisture as quickly as possible.

In another known method such as the method described in U.S. Pat. No. 4,877,422, the interior of an insulated boom section is dried by supplying a constant stream of non-heated air from an air source into the boom.

Yet another method is described in Applicant's US Patent Application having Publication No. 2019/0112172. In this method, interior and exterior surfaces of an insulated boom section are dried by directing substantially uniform flows of air along these surfaces.

To ensure safety at the work site, for barehand operations, the insulated boom section is subjected to a daily electrical leakage test and is also constantly monitored for the insulative characteristics (leakage current) of the insulated boom section. During this test, the bucket is moved to a position adjacent the live conductor and contact is made between the upper boom and the live conductor via a probe operatively coupled to the metal components at the top end of the insulated boom section. Leakage current flowing along and through the insulated boom section is measured using current meters operatively coupled to the bottom of the insulated boom section and to ground. If the leakage current is within a permissible range, barehand work is commenced. If the leakage current is over the permissible range, then contact with the live conductor is immediately broken and the insulated boom section is cleaned and dried. In Applicant's experience, readings over the permissible range are the result of contamination and moisture on the insulated boom section. Once the insulated boom section has been cleaned and dried, it is retested. Work is not commenced unless the insulated boom section has passed the daily electrical leakage test.

As is clear from the above, controlling contamination and moisture levels on the insulated boom section is very important. Most of the methods discussed above for cleaning and drying the boom are carried out at the work site, prior to the daily electrical leakage test.

Drying an insulated boom section manually takes away productive crew time. During the time required for manually drying the boom and the boom undergoing the daily electrical leakage test, productivity of the crew is interrupted until the insulated boom section has passed the daily electrical leakage test. This can be a costly downtime, and, in Applicant's view, the loss of productive crew time is preventable had the insulated boom section been dry and ready for the daily electrical leakage test as soon as it arrived at the work site.

SUMMARY

Accordingly, in one embodiment a system for drying an exterior of an insulated boom section of an aerial lift device is provided. The system comprises at least one electrically insulating boom cover which is adapted to be disposed over the exterior of the insulated boom section to completely encapsulate the insulated boom section within the at least one boom cover when the at least one boom cover is disposed over the exterior of the insulated boom section. The system also comprises air gap spacers spaced apart and operatively coupled to an inner surface of the at least one boom cover to space the at least one boom cover from the exterior of the insulated boom section by an air gap when the at least one boom cover is disposed over the exterior of the insulated boom section so that the air gap and an airflow passageway corresponding to the air gap completely surrounds the insulated boom section. The system further comprises retaining elements which are operatively coupled to the at least one boom cover to releasably retain the at least one boom cover on the exterior of the insulated boom section when the at least one boom cover is disposed over the exterior of the insulated boom section. Additionally, the system comprises first and second end covers which are adapted to be operatively coupled to corresponding opposite distal ends of the at least one boom cover when the at least one boom cover is mounted on the insulated boom section. Further, the system comprises an airflow inlet operatively coupled to the at least one boom cover and adapted to receive air when the at least one boom cover is disposed over the exterior of the insulated boom section and to pass the air into the airflow passageway, and an airflow regulator which regulates flow of the air from the airflow passageway when the at least one boom cover is mounted on the insulated boom section. In use, when the at least one boom cover is at least disposed, spaced, and retained on the insulated boom section, the air received by and flowing through the inlet is directed along the airflow passageway so as to flow over and along the exterior of the insulated boom section encapsulated within the at least one boom cover.

Accordingly, in another embodiment, a method using the system described above, for drying an insulated boom section of an aerial lift device is provided. The method comprises disposing and spacing the boom cover on and from the exterior of the insulated boom section so as to encapsulate the insulated boom section within the boom cover. The method further comprises releasably retaining the boom cover on the insulated boom section with the retaining elements, and operatively coupling the first and second end covers to the corresponding outer ends of the boom cover, respectively. Additionally, the method comprises directing the air through the inlet along the airflow passageway and onto and along the exterior of the insulated boom section encapsulated within the boom cover to dry the exterior while regulating release of the air to the ambient.

BRIEF DESCRIPTION OF THE DRAWINGS

FIGS. 9A to 9E are perspective views illustrating installation of the system of FIG. 2 on an electrically insulated boom section, wherein: FIGS. 9A and 9B show the opening of the boom cover to allow for installation of a first or bottom half of the boom cover on a lower portion of the exterior of the insulated boom section, FIG. 9C shows the installation of a second or top half of the boom cover on an upper portion of the exterior of the insulated boom section, including sealing of a hinge connecting the two halves of the boom cover, FIG. 9D shows installation of the top end cover and 9E shows installation of the bottom end cover on the boom cover;

FIGS. 14A to 14E are perspective views illustrating installation of a system incorporating the modular boom cover of FIG. 10 on an electrically insulated boom section, wherein: FIG. 14A shows location of two sections of the boom cover of FIG. 10 on the exterior of the insulated boom section in an end-to-end relation with a small or negligible gap between the cooperating opposed-facing ends of the two sections, FIG. 14B shows installation of the first or lower section of the modular boom cover on the exterior of the insulated boom section, FIG. 14C shows installation of the second or upper section of the modular boom cover on the exterior of the insulated boom section, FIG. 14D shows sealing of the gap between the two lower and upper modular boom cover sections with a joint cover, FIG. 14E shows installation of the end covers on opposite outer ends of the modular boom cover.

DETAILED DESCRIPTION

Embodiments described herein relate to an air gap boom cover system and method for drying the exterior surface, alternatively referred to herein as the boom exterior, of an electrically insulated boom section on the boom of a bucket truck. The system includes a boom cover which, when disposed over the exterior of the insulated boom section, encapsulates substantially the entirety or the entire length of the insulated boom section within it. The system also includes components for retaining the boom cover on, and sealing the boom cover to, the insulated boom section. The system may advantageously include spacers for spacing the boom cover, when it is disposed on the exterior of the insulated boom section, from the exterior surface of the insulated boom section to define an air gap which forms a corresponding airflow passageway between the boom cover and around the exterior surface of the insulated boom section. For example, where the insulated boom section is circular in cross-section, the air gap may approximate a cylinder. Although the cross-sectional shape of the boom cover is illustrated as circular, this is not intended to be limiting, as the boom cover could be square or rectangular in cross-sectional, for example where the insulated boom section is also square or rectangular in cross-section. The system also includes components for receiving air into the boom cover, so as to move the air through the airflow passageway for drying the exterior surface of the insulated boom section, and for venting the air from the boom cover, in a controlled manner, after the drying operation.

Embodiments described herein describe and depict the aerial lift device as a bucket truck. However, this should not be considered to be limiting of the system and method described herein.

Figure 2:
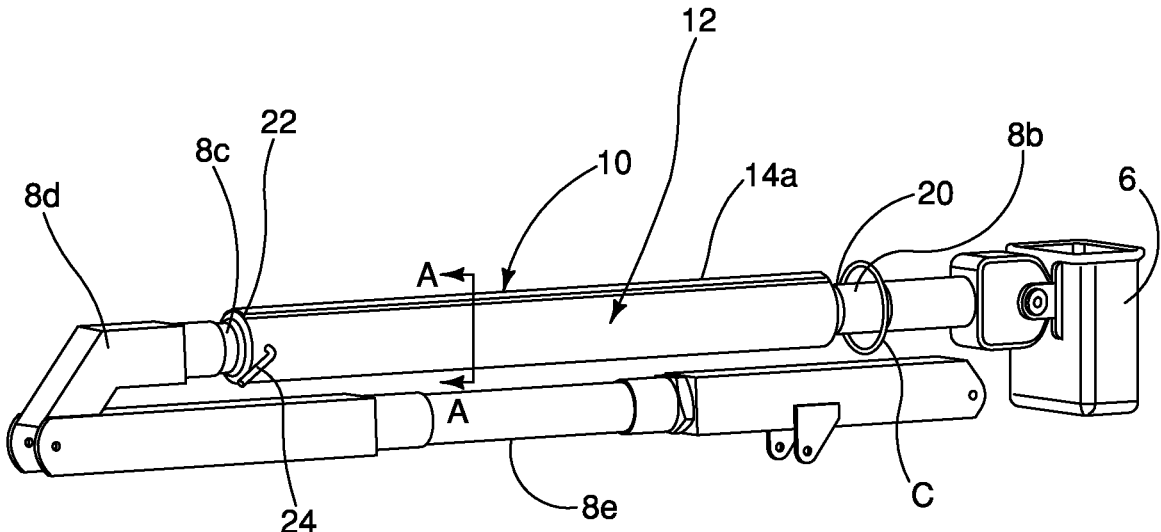
FIG. 2 is a perspective front view of one embodiment of a boom cover system, including a boom cover described herein, shown installed on an electrically insulated boom section of the bucket truck of FIG. 1 while the boom is in a retracted or stowed position.

Further, as described and illustrated herein, the system and method may be employed while the insulated boom section is in a stowed position such as seen in FIG. 2 and the bucket truck parked at its work yard where it is stored overnight, or while the bucket truck is being driven to a work site. In Applicant's experience, it is advantageous to commence drying of the boom prior to arrival at the worksite so as to increase productivity. Again, this is not to be considered limiting as the system and the method may be employed on the boom at the work site to dry the insulated boom section before the daily electrical leakage test and while the boom is in its extended or deployed position.

As used herein, "insulated" or "insulative" is intended to mean electrically insulating, dielectric or electrically non-conducting.

Figure 3:
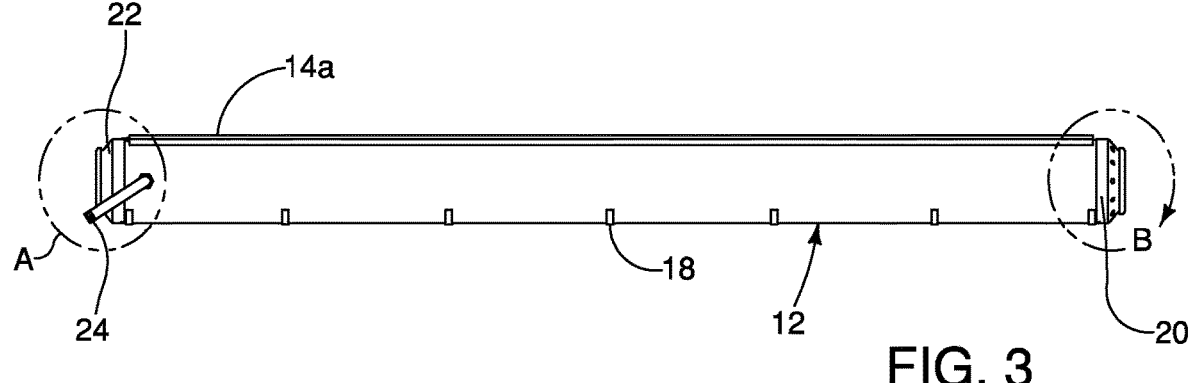
FIG. 3 is a side view of one embodiment of the boom cover of the system of FIG. 2.

FIGS. 2 and 3 illustrate one embodiment of the drying system described herein. As seen in FIG. 3, system 10 of FIG. 2 includes at least one boom cover 12 which is adapted, sized and shaped to encapsulate the entirety or the entire length or substantially the entire length of an insulated boom section 8 of a bucket truck 2, within it, when the boom cover 12 is disposed so as to be releasably mounted on the boom exterior 8a of the insulated boom section 8. Advantageously, the boom cover is shaped to conform to the shape of the insulated boom section. As seen in FIG. 2, when the boom cover 12 is disposed on the boom exterior, it extends between a first or upper end 8b and an opposite second or bottom end 8c of the insulated boom section. In one embodiment, the first or upper end 8b is located adjacent the bucket 6 and corona ring C, and the second or bottom end 8c is located adjacent an elbow or connection joint 8d connecting the insulated boom section 8 to a non-insulated boom section or sections 8e located below the insulated boom section 8.

In one embodiment, the boom cover 12 is made of a dielectric material such as thermoplastic polymer, fiberglass or similar. Further, the boom cover 12 may be constructed using a rigid material as illustrated herein or using a pliable flexible or semi-rigid material, wherein, in the latter two cases, air pressure from the air in the airflow passageway defined by the boom cover is sufficient to hold the airflow passageway open, with or without the assistance of the spacers described below, and the boom cover inflated into a tubular shape.

The boom cover 12 may be constructed in various ways. For example, the boom cover may be a single two piece boom cover that extends all along the insulated boom section or it may be of a modular configuration including multiple parts or sections that interact with each other to form a boom cover that extends all along the insulated boom section. In FIGS. 2 to 9E, a single two piece boom cover 12 that extends all along the insulated boom section is illustrated. In this embodiment, the boom cover 12 is formed of two halves that are mirror images of each other. Each half is a unitary hollow half-pipe mating with its other unitary hollow half-pipe. As one skilled in the art will understand, the boom cover 12 of FIGS. 2 to 9E may be formed of two or more shells that are not identical or mirror images of each other.

FIGS. 10 to 15 illustrate a modular configuration of the boom cover 12. In this embodiment, the modular boom cover 12 is constructed of two sections 12f that are joined and sealed together, end-to-end, such as seen by way of example in FIG. 10. Each section 12f is similar to the boom cover illustrated in FIGS. 2 to 9E.

Figures 6, 7:
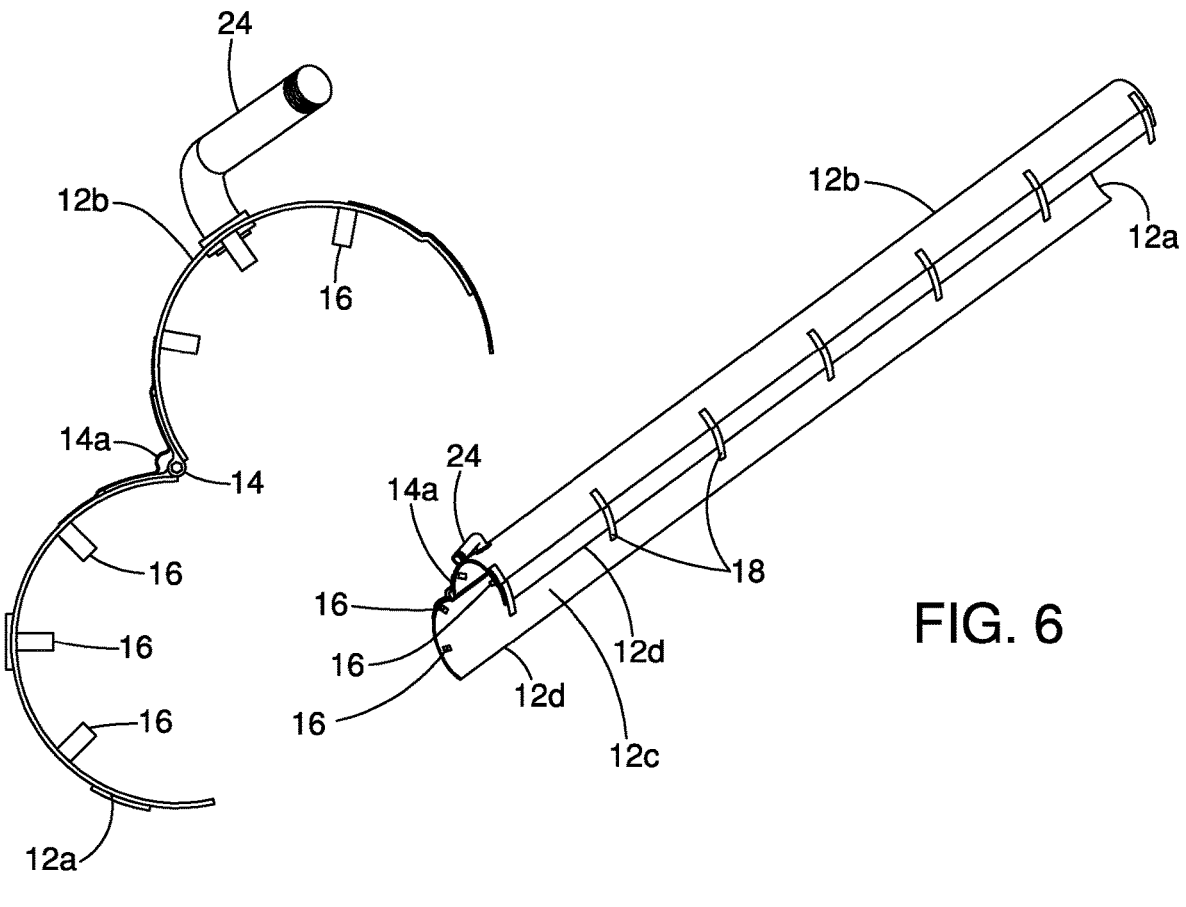
FIG. 6 is a perspective view of the boom cover of FIG. 3, when the boom cover is in an open position.
FIG. 7 is an end view of the boom cover of FIG. 6.

As stated above, FIG. 6 illustrates an example of a single two piece boom cover that extends all along the insulated boom section. In this embodiment, not intended to be limiting, the boom cover 12 is made of a rigid material and is formed by a first half 12a and a second half 12b, which are mirror images of each other. Each half has an inner surface 12c and cooperating edges 12d. The two halves are connected in an edge-to-edge relation, for example in a clam-shell arrangement, through a hinged connection. In this embodiment, the hinged connection is through hinge 14, which is elongate and extends substantially along the entire length of the boom cover 12. In another embodiment, the hinged connection may be through multiple hinges 14' along the length of the boom cover such as seen by way of example in FIGS. 12A and 13. To seal the hinge joint and thereby seal the boom cover 12 to the ambient, in one embodiment, the hinge 14 or hinges 14' may be provided with a seal such as an elongate flexible cover 14a. In one embodiment, flexible cover 14a is a strip of waterproof flexible material such as water-proof tape mounted over and along the length of cover 12.

Figure 8:
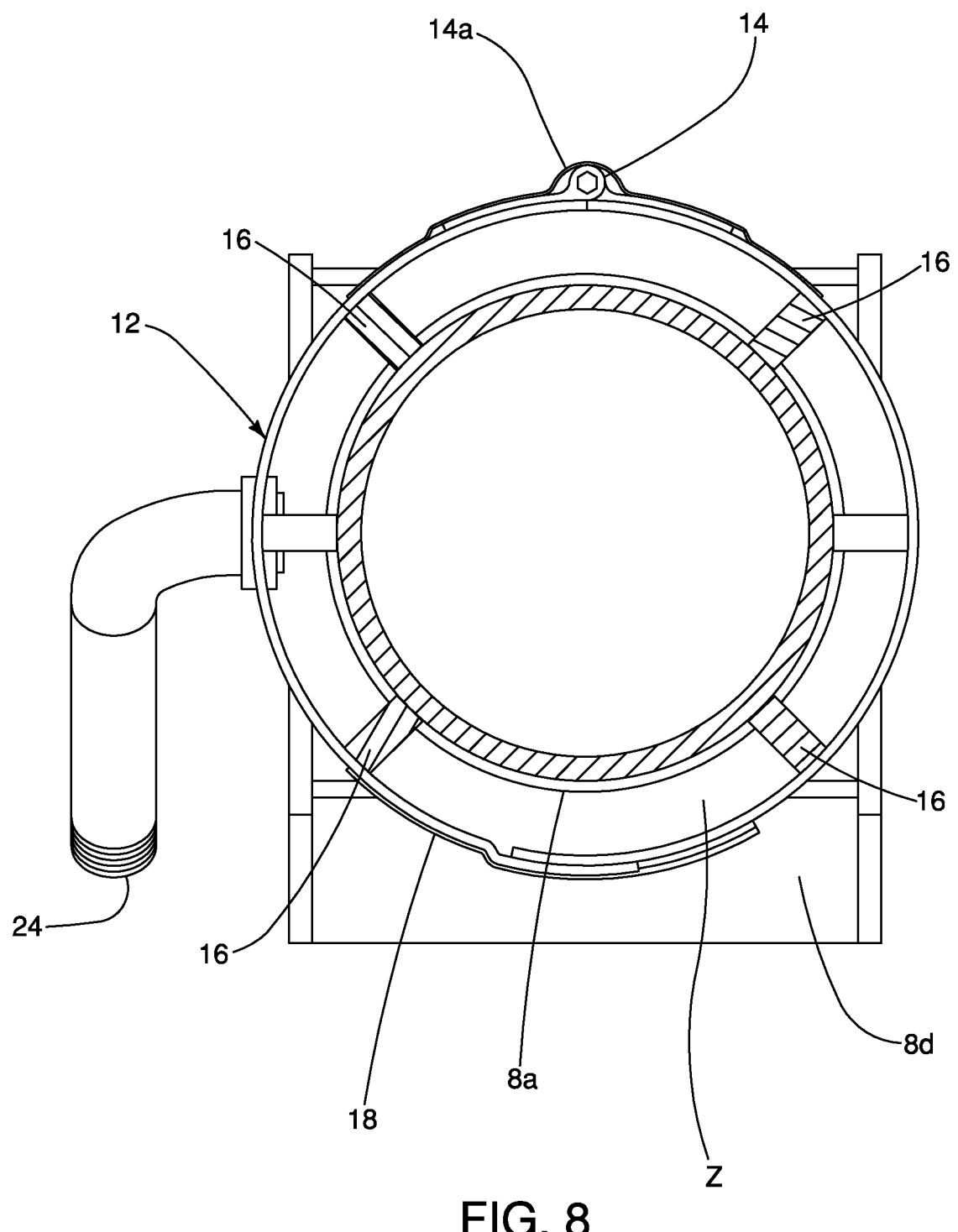
FIG. 8 is a partial sectional end view of a portion of the boom and boom cover of FIG. 2 adjacent a connection joint on the boom, taken along line A-A.

When boom cover 12 is mounted on the insulated boom section 8, boom cover 12 is spaced from the boom exterior 8a by air gap spacers 16. In one embodiment and as best seen in FIGS. 7 and 8, the spacers 16 may be formed integrally on the inner surface 12c of the boom cover 12. Spacers 16 may also be separate components which are mounted to the inner surface 12c of boom cover 12, for example in a spaced array therealong. As depicted in FIGS. 7 and 8, boom cover 12 includes spacers 16 on its inner surface 12c in a spaced apart relationship along the entire length of the boom cover. Advantageously, the spacers 16 are evenly spaced apart along the length and width of the inner surface 12c. Spacers 16 each may have a height ranging from 1.5 inches to 3 inches, although this is not intended to be limiting. The spacers 16 may be formed of PVC or fiberglass, although other dielectric rigid or semi-rigid materials would also work. Spacers 16 separate and space the boom cover 12 from the boom exterior 8a of the insulated boom section 8 so that boom cover 12 does not lie flush against, or otherwise touch or rest against the boom exterior 8a and is separated from the boom exterior 8a by the air gap Z, best seen in FIG. 8, forming the airflow passageway around the entirety of the insulated boom section 8. In one embodiment, the air gap Z is approximately 2 inches, measured perpendicular to boom exterior 8a, although, again, the stand-off distance of air gap Z may be varied by varying the length of the spacers 16.

Figure 13:
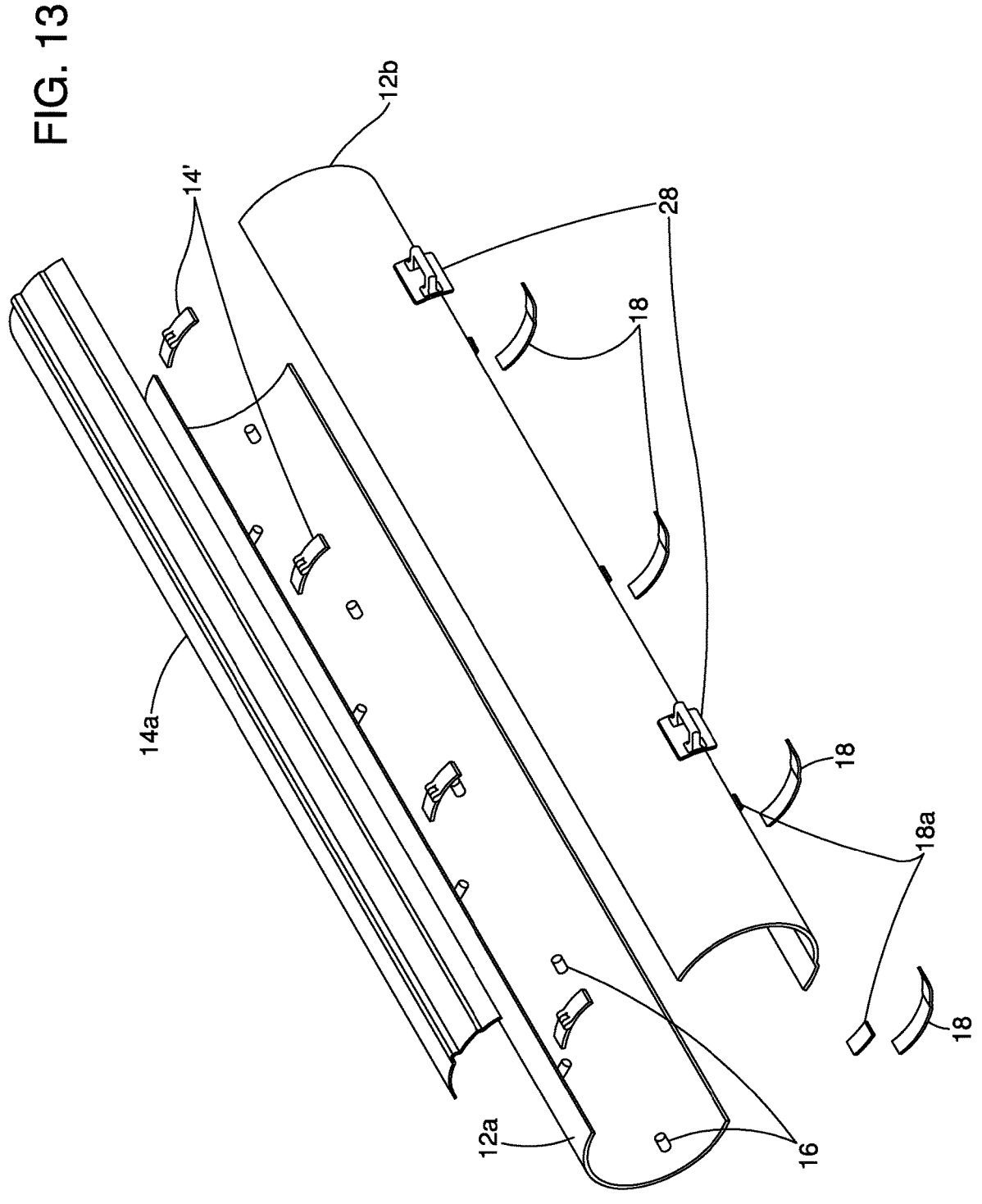
FIG. 13 is an exploded view of FIG. 11C.

The system also advantageously includes retaining elements operatively coupled to boom cover 12 to retain the boom cover 12 on the boom exterior 8a of the insulated boom section 8. In one embodiment and as seen in FIGS. 6 and 13, the retaining elements may include releasable loop and hook fasteners such as VELCRO® straps 18 and pads 18a on cooperating edges 12d of boom cover 12. In one embodiment, the cooperating edges 12 are made to overlap, so as to seal the boom cover 12 around this area, and the boom cover 12 is retained, in this position, on the boom exterior 8a by engaging the releasable loop and hook fasteners. In other embodiments, cooperating edges 12d may simply abut one another, so long as boom cover 12 remains sealed from the ambient when the boom cover is mounted on, so as to enclose, insulated boom section 8. Other releasable fastening or retaining elements or mechanisms have been contemplated by the Applicant to retain boom cover 12 on insulated boom section 8. Contemplated releasable fastening or retaining elements or mechanisms are straps, snaps, buttons, zippers, magnets, latches, etc., such as the latches 30 shown by way of example in FIG. 15.

Figure 5:
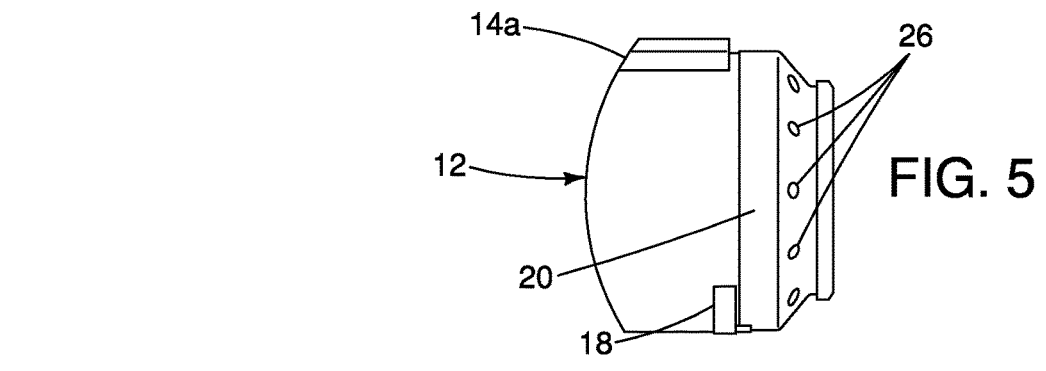
FIG. 5 is a close-up side view of the boom cover of FIG. 3, taken in circle B.
Figure 4:
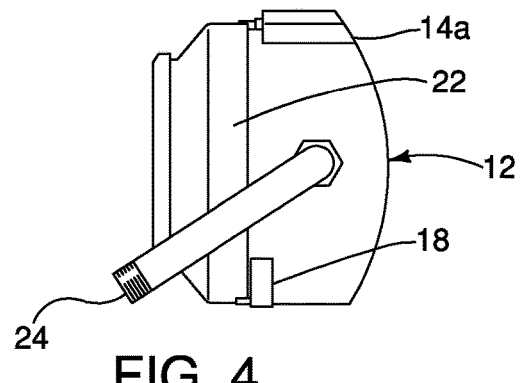
FIG. 4 is a close-up side view of the boom cover of FIG. 3, taken in circle A.

Further, the system in a preferred embodiment, not intended to be limiting, includes couplers or end covers which are adapted to be operatively coupled to corresponding opposite outer ends of the boom cover 12. In one embodiment, the end covers seal the outer ends of boom cover 12 onto boom exterior 8a of the insulated boom section 8 when the boom cover 12 is in use. In one embodiment, the end covers include first or upper end cover 20 and second or lower end cover 22 such as illustrated in FIGS. 3, 4 and 5, for example. When boom cover 12 is disposed on the boom exterior 8a, end covers 20, 22 seal the opposite outer ends of boom cover 12 onto boom exterior 8a of the insulated boom section 8 at its corresponding upper and lower ends 8b, 8c respectively. End covers 20, 22 may be moisture impermeable flexible annular covers, ring seals, flexible annular plates, or other means of providing an air seal and inhibiting moisture incursion and sealing the outer ends of boom cover 12 onto the exterior surface of the insulated boom section 8.

Figure 1:
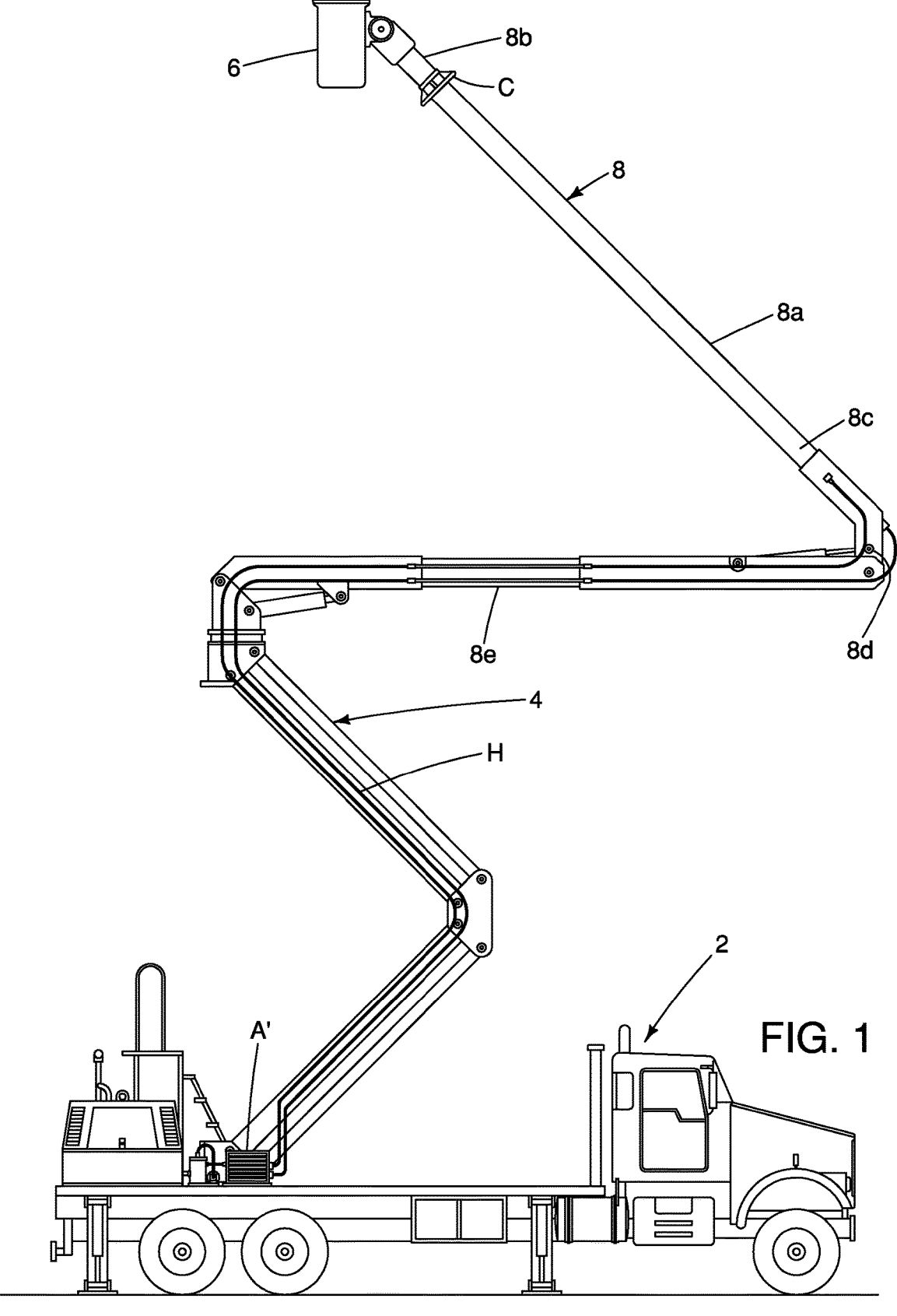
FIG. 1 is a side elevational view of a conventional or prior art bucket truck with its boom and bucket partially extended from the truck.

The system also includes an airflow inlet 24, for example a pipe, tube, hose, etc., operatively coupled to, so as to be in fluid communication with the interior of boom cover 12 when the boom cover 12 is mounted on boom exterior 8a. The inlet 24 allows, or enables pressurized air received from a dedicated air source A' (such as seen in FIG. 1) to flow into the airflow passageway defined by air gap Z. Inlet 24 is adapted to receive and direct the air along the airflow passageway when boom cover 12 is disposed on the boom exterior 8a. In one embodiment and as seen in FIG. 6, the inlet 24 may be mounted near the lower end of boom cover 12 to which the second end cover 22 is attached. In other embodiments, inlet 24 may be mounted elsewhere along the length of the boom cover, for example such that it is equidistant from the opposite outer ends of the boom cover 12. Further, in other contemplated embodiments, the inlet 24 may be mounted on or near the first or second end covers.

In one embodiment, the air source A' is located either on or adjacent the bucket truck 2. In this embodiment, the air source A' produces and drives warm and/or dry air at a moderate flow rate along an air hose H such as illustrated in FIG. 1 to and through inlet 24 so that the warm and/or dry air flows through the airflow passageway defined by air gap Z when boom cover 12 is mounted on insulated boom section 8. The flow rate and air pressure are sufficient to flow air from air source A' completely around and along insulated boom section 8 for drying the boom exterior 8a and for release of the air in a controlled manner through the upper end of boom cover 12, opposite to inlet 24, after the drying operation. In one embodiment, air is vented in a controlled manner through an airflow regulator. The airflow regulator, in one embodiment and as illustrated includes vent holes 26 in upper end cover 20 opposite to inlet 24 as shown in FIG.

5. As one skilled in the art will understand, for controlled venting, instead of vent holes one-way valves or gaps or holes or other flow restrictors in or between other components of the boom cover system may also be employed or utilized. Further, as one skilled in the art will understand, the temperature of the air in the airflow passageway is maintained and regulated such that structural integrity of the various components of the system is maintained during the drying operation.

Figure 9A:
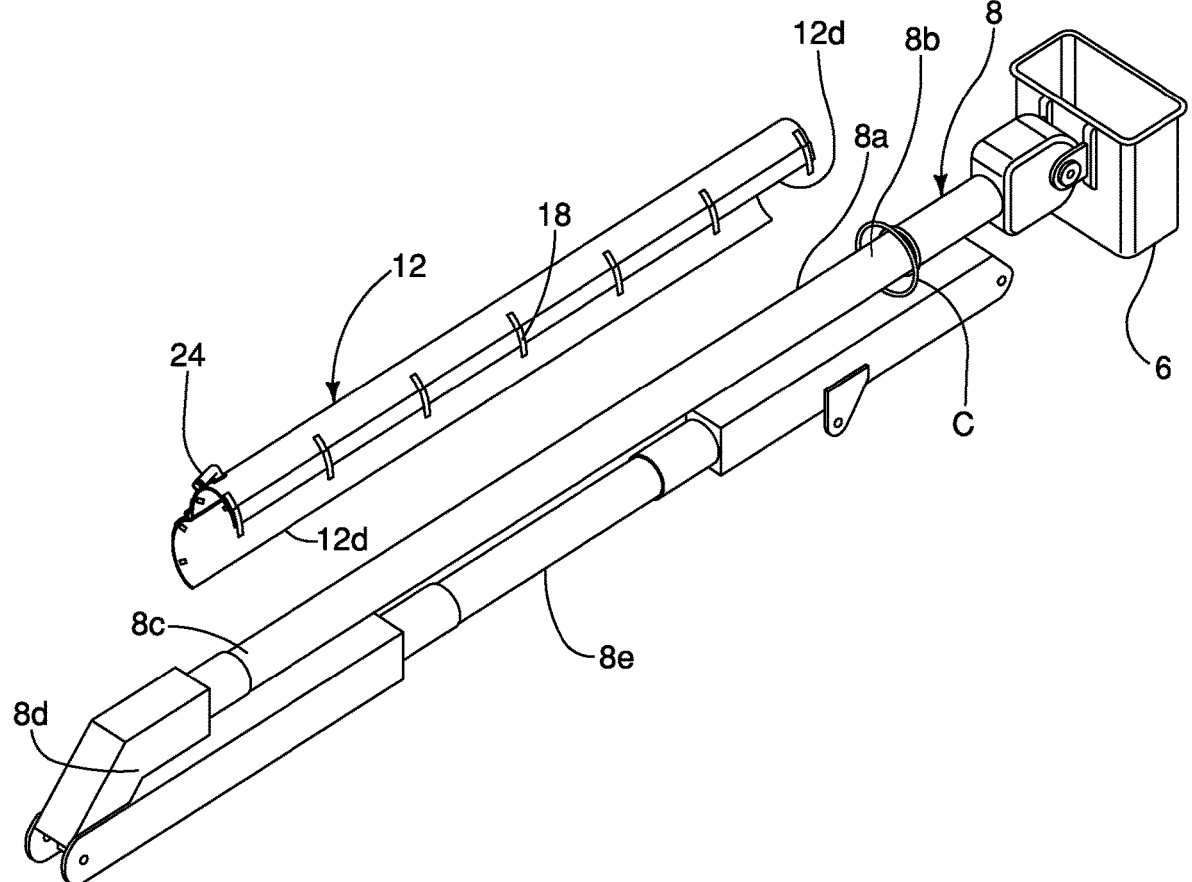

In another embodiment, the supply of air for air source A' is recycled air, such as air used to dry the interior of the insulated boom section 8 and recycled after exiting from the interior of the boom section. In the embodiment of FIG. 9A, the air through boom cover 12, after the drying operation, exits from between boom cover 12 and the exterior surface 8a of insulated boom section 8 from the upper end of the airflow passageway defined by air gap Z. In the alternative embodiment, where air is recycled from the interior of insulated boom section 8 to dry the exterior surface 8a, the air to be recycled may exit the interior of insulated boom section 8 at the upper end 8b of insulated boom section 8, and then be directed into air gap Z between boom cover 12 and the exterior surface 8a of insulated boom section 8 through inlet 24. In this embodiment, the inlet 24 may be located adjacent the upper end 8b of insulated boom section 8 so that recycled air flows down the airflow passageway defined by air gap Z to exit via vent holes, one-way valves or the like in end cover 22 after the drying operation.

In use, when the boom cover 12 is mounted on the boom exterior 8a of insulated boom section 8, the boom cover 12 substantially encapsulates the entire length and width of the insulated boom section 8. The retaining elements such as hook and loop straps 18 releasably fasten onto corresponding hook and loop pads 18a (best seen in FIGS. 12B and 13) so as to retain the boom cover 12 in position over the boom exterior 8a. It is to be understood that if hook and loop straps 18 have a loop surface then the hook and loop pads 18a will have a hook surface, and vice-versa. The first and second end covers 20, 22 seal the outer ends of the boom cover 12 to the corresponding ends, 8b and 8c, of the insulated boom section 8. The inlet 24 receives and directs air around and along the airflow passageway defined by air gap Z so as to impinge onto and along the boom exterior 8a for drying of the boom exterior 8a encapsulated within the boom cover 12. As the boom cover 12 is completely sealed during the drying operation, in particular, along the hinge joint, along the cooperating edges and at its outer ends escape of air other than through the vent holes, or moisture incursion during the drying operation is inhibited. Further, in some embodiments, release of air from within boom cover 12 to the ambient atmosphere after the drying operation is also regulated. In one embodiment, and as described above, regulation is by way of vent holes 26 or one-way valves or the like in the upper end cover 20. Thus, the dwell time of the air on boom exterior 8a may be optimized for optimized drying time.

As described above, air in the air gap Z is vented in a regulated or controlled manner via a venting mechanism or airflow regulator such as the illustrated vent holes 26 spaced apart in and around end cover 20. Controlled venting controls the volumetric flow of air in the airflow passageway, so that rapid and complete drying of boom exterior 8a is achieved while still providing sufficient dwell time for the air impinging and flowing over the boom exterior 8a to absorb any moisture thereon.

In one embodiment, the first and second halves of the boom cover 12 are not hingedly connected to each other in an edge-to-edge relation. In this embodiment, after the two halves have been installed on the boom exterior 8a with the cooperating edges 12d abutting one another with no gap between the cooperating edges, the two halves are secured on the boom exterior 8a, in this position, by wrapping the retaining elements, such as straps, all around the exterior surfaces of the first and second halves and securing the retaining elements. A sealed boom cover 12 is thus provided on the boom exterior 8a.

Figure 10:
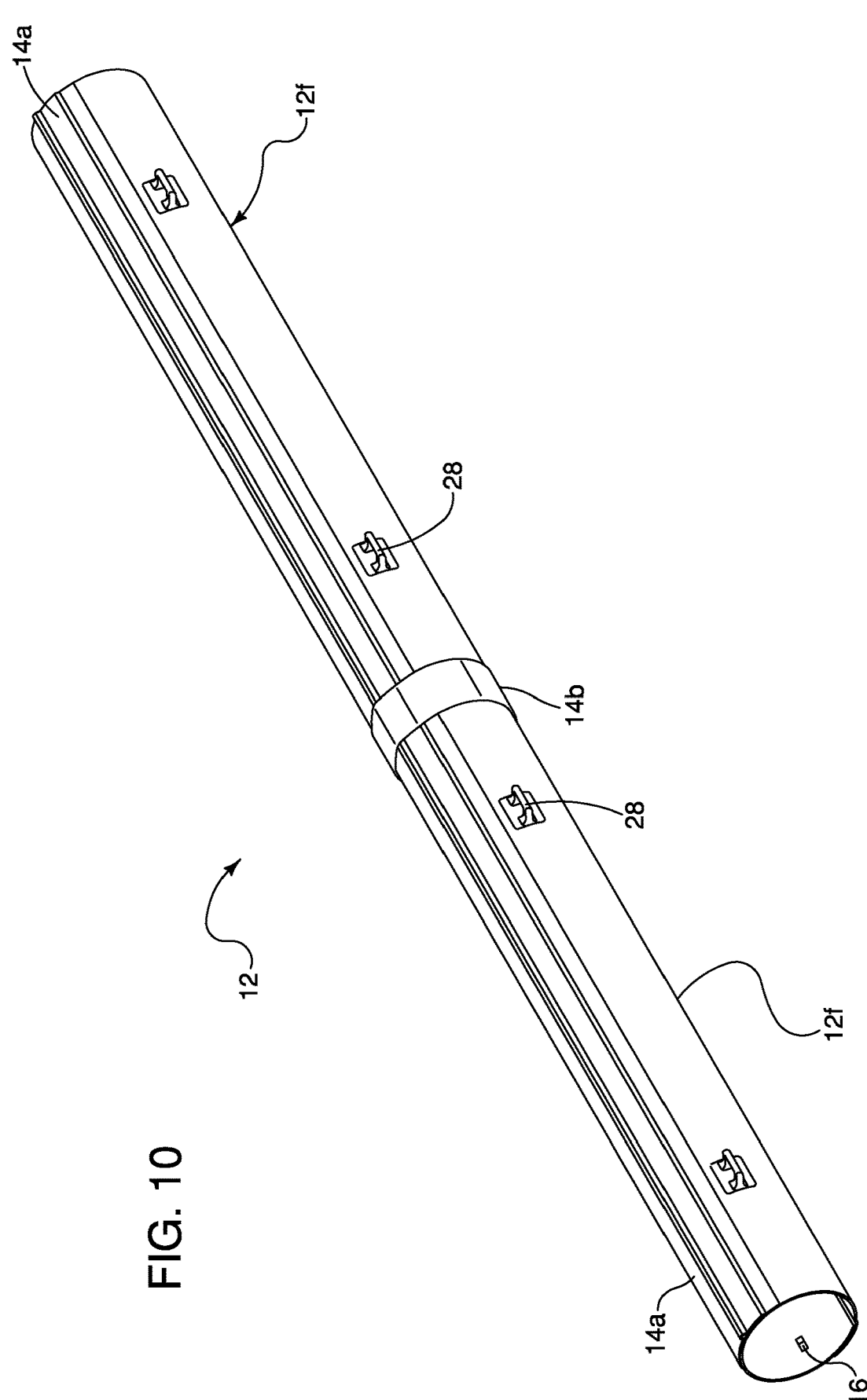
FIG. 10 is a perspective front view of a modular embodiment of the boom cover of the system of FIG. 2.
Figure 11A:
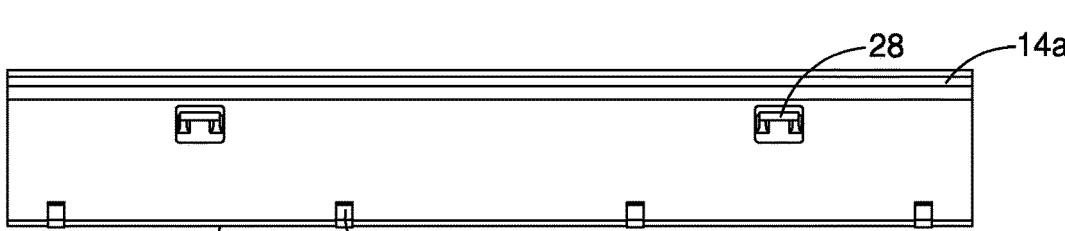
FIGS. 11A, 11B, 11C and 11D are front, back, front perspective and end views, respectively, of one section of the modular boom cover of FIG. 10.
Figure 11B:
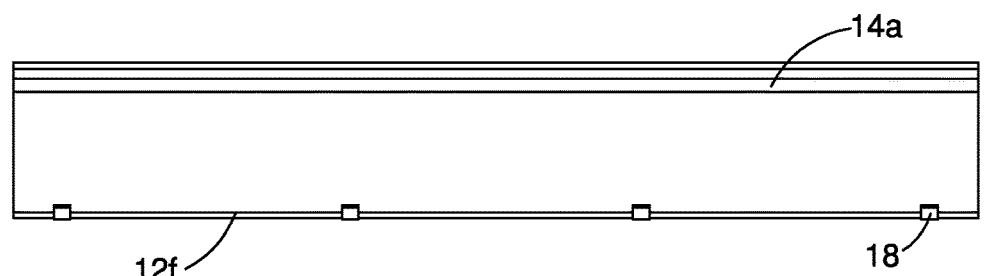
Figure 11C:
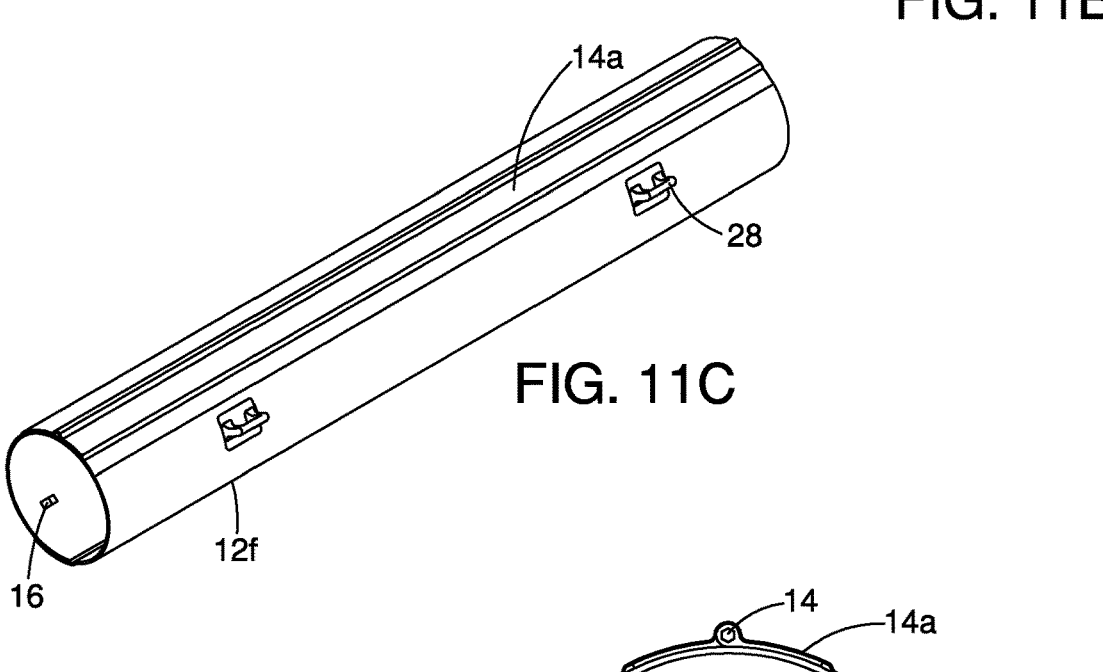
Figure 11D:
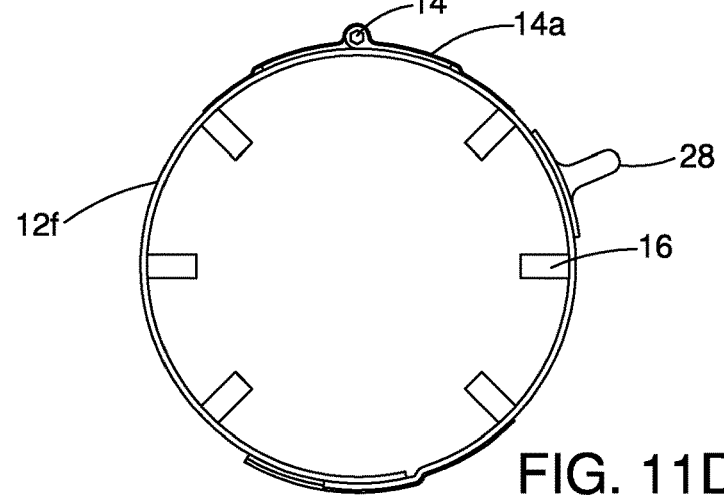

In one embodiment, to help with handling and installation, the boom cover 12 may be provided with handles 28, best seen in FIG. 10, on the exterior surface of the boom cover 12.

The following paragraphs with reference to FIGS. 9A to 9E describe installation of the system 10 on the insulated boom section 8 when the insulated boom section 8 is in a stowed or retracted position.

Figure 9B:
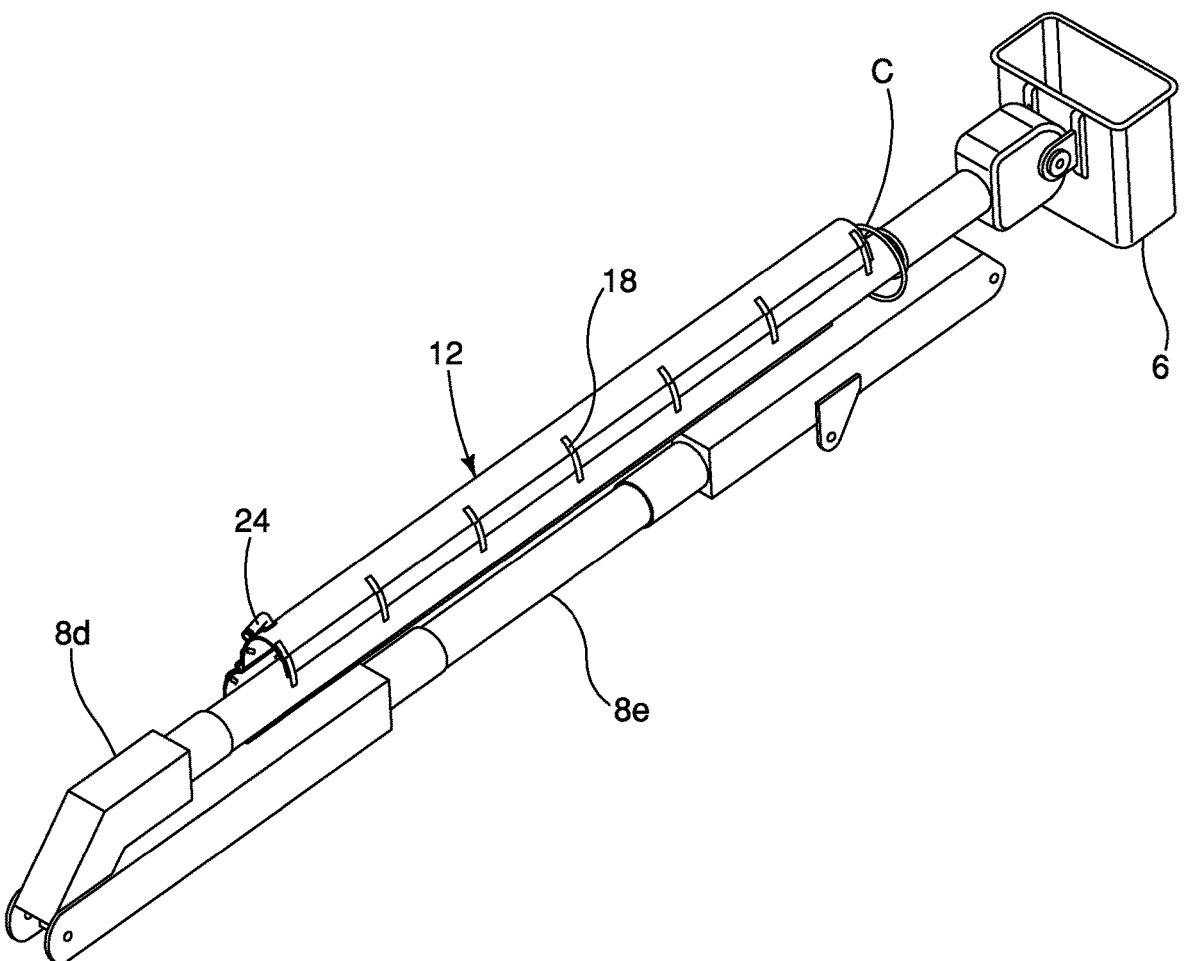
Figure 9C:
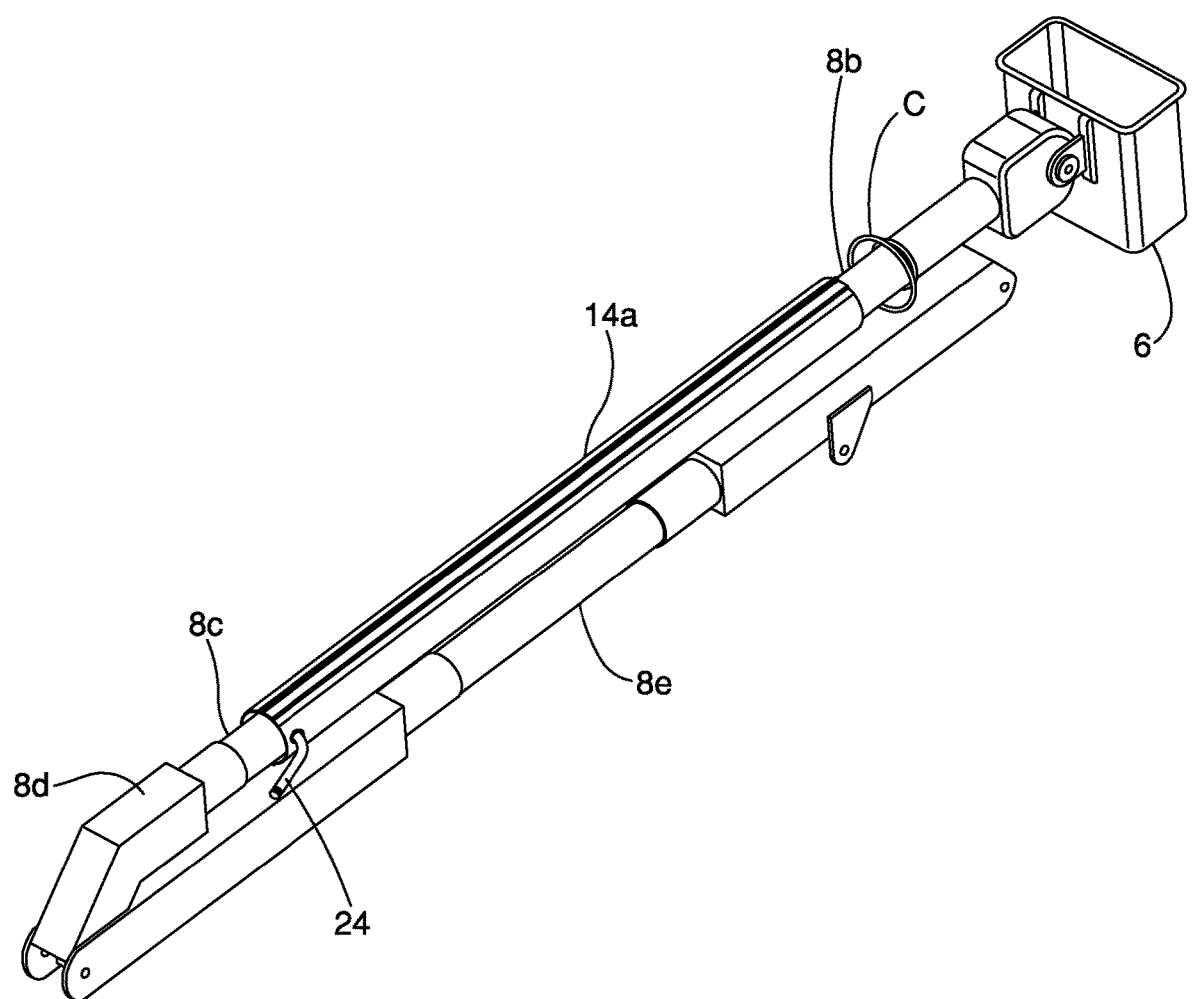

FIG. 9A shows the opening of boom cover 12 for placement of the first half 12a of the boom cover 12 over a lower portion of the insulated boom section 8. FIG. 9B shows placement of the first half 12a of the boom cover 12 over the lower portion of the insulated boom section 8. FIG. 9C shows second half 12b of the boom cover 12 over an upper portion of the insulated boom section 8 and closing of the boom cover 12 over the insulated boom section 8 along the lower portion of the insulated boom section by bringing the two halves in an edge-to-edge relation. As described above for sealing the boom cover around the cooperating edges area, cooperating edge 12d of half 12b is overlapped over the cooperating edge 12d of half 12a along the lower portion of the insulated boom section.

Figure 9D:
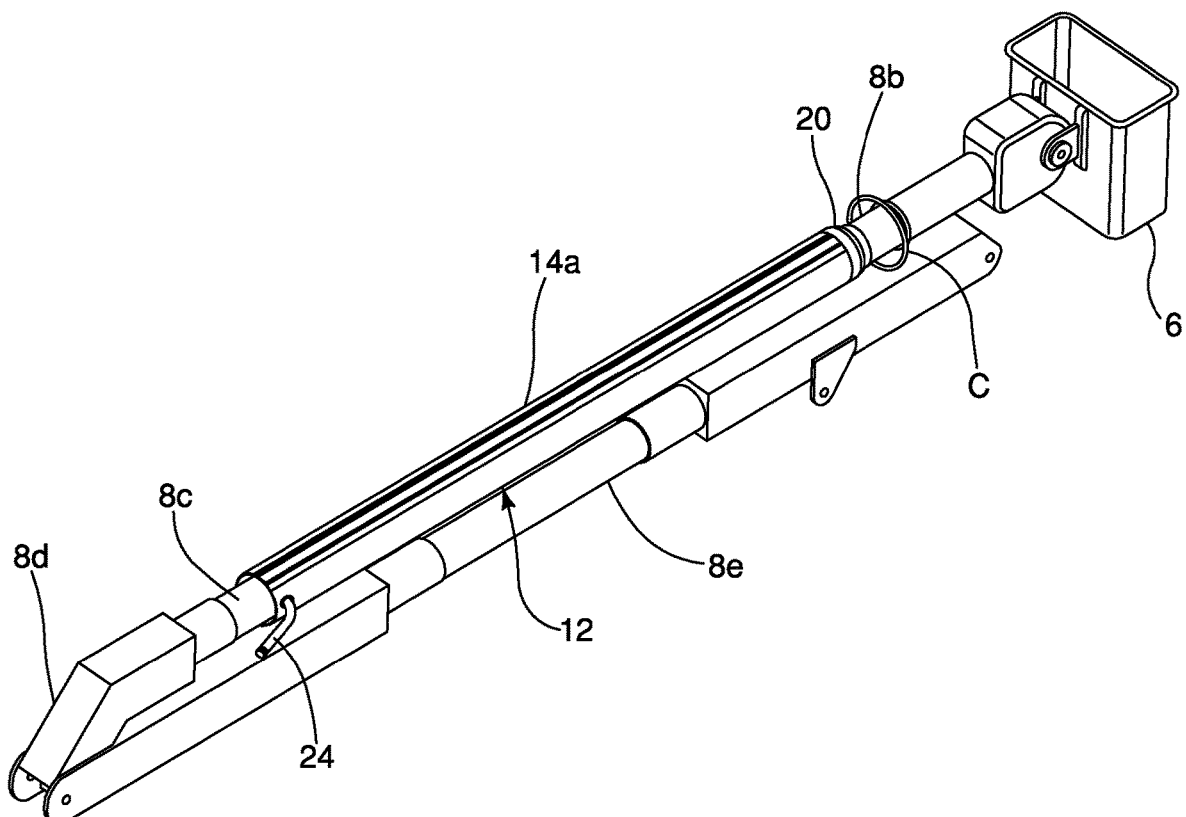
Figure 9E:
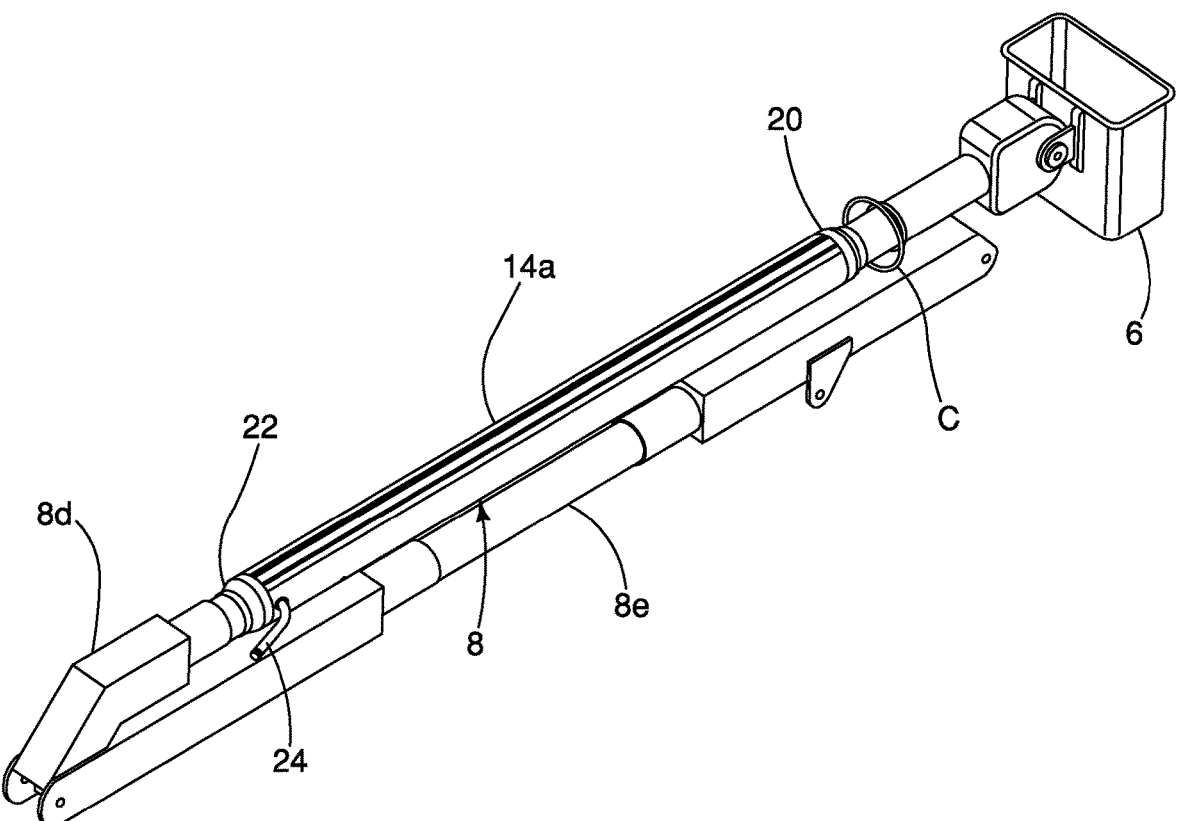

FIG. 9C also shows sealing of the hinge 14 and securing of boom cover 12 with VELCRO® hook and loop straps and pads 18 and 18a. FIG. 9D shows coupling of the first or upper end cover 20 to boom cover 12 to seal the upper outer end of the boom cover to the insulated boom section 8 at its first upper end 8b. FIG. 9E shows coupling of the second or bottom end cover 22 to the bottom outer end of the cover 12 to seal the boom cover to the insulated boom section 8 at its second bottom end 8c.

As is clear from the above, the system 10 described herein may be installed on insulated boom section 8 without any modification to the insulated boom section 8.

It must also be noted that the boom cover 12 is not limited to round insulated boom sections, but with spacer modification can be used on square or rectangular insulated boom sections. Further it is also not limited to aerial lift bucket trucks as shown in FIG. 1 but can also be used on any insulated boom section, such as insulated jibs attached to crane booms for barehand work.

FIGS. 10 to 15 illustrate another configuration of the boom cover 12. In these figures and in the embodiments described in the following paragraphs, the boom cover 12 is of a modular configuration for ease of handling and installation. There is no difference in the functioning of the boom cover illustrated in FIGS. 2 to 9E and in FIGS. 10 to 15. The system of FIGS. 10 to 15 is substantially the same as the system of FIGS. 2 to 9E except for the modular configuration of the boom cover in FIGS. 10 to 15. Therefore, like elements are denoted by the same reference numerals throughout the figures. Further, description of like elements is not repeated in the following paragraphs.

As seen in FIG. 10, boom cover 12 is formed of two sections 12f. The configuration of each section 12f, in one embodiment, is similar to the configuration of the boom cover 12 in FIGS. 2 to 9E. In short, each section 12f is formed of two halves that are hingedly connected in an edge-to-edge relation by one hinge 14 or multiple hinges 14'.

Figures 12A, 12B, 12C, 12D:
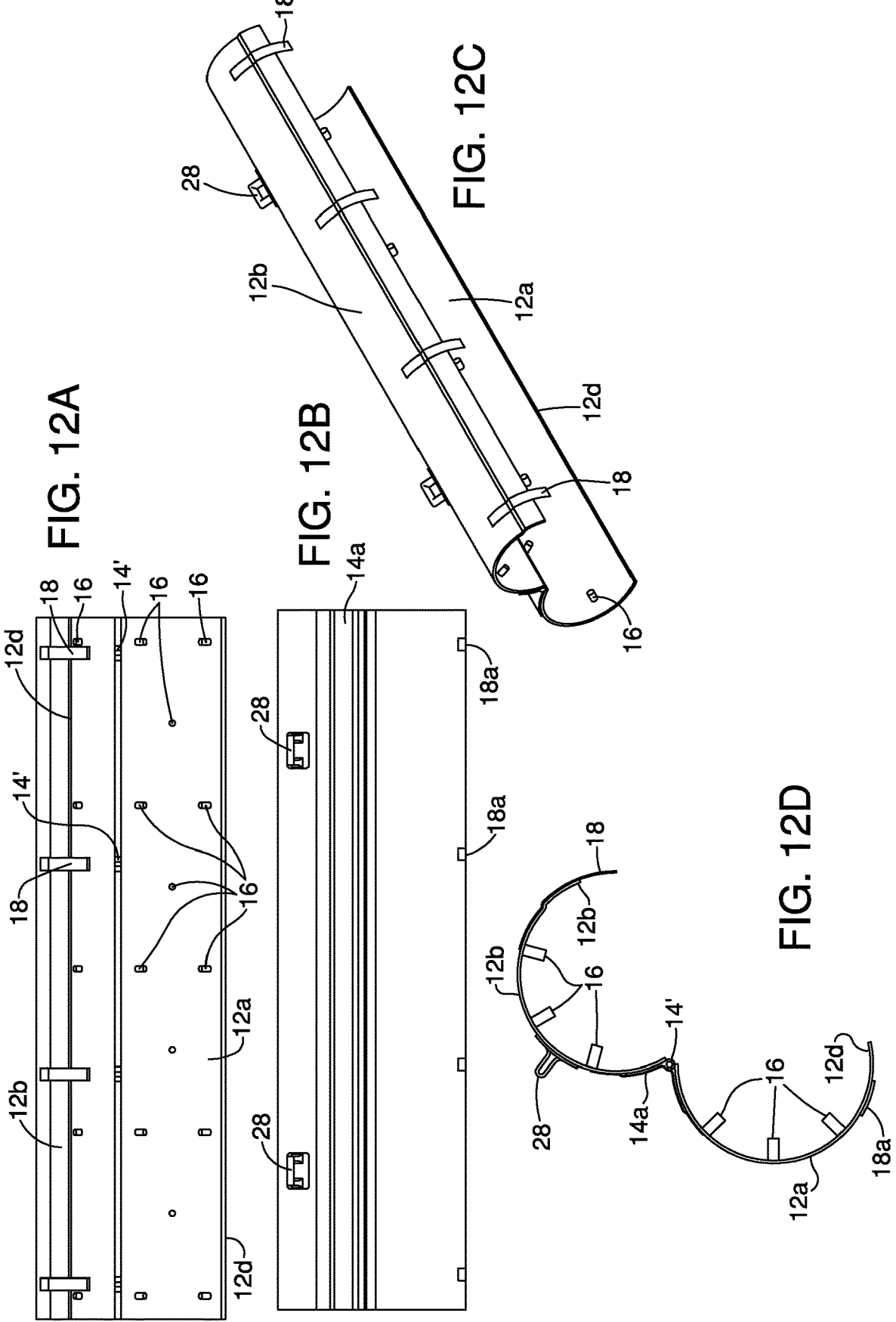
FIGS. 12A, 12B, 12C and 12D are inner, outer, front perspective and end views, respectively, of the modular boom cover section of FIGS. 11A to 11D.

For ease of handling and installation, each section 12f may also be provided with handles 28, as seen in FIGS. 10 and 12C.

Figure 14A:
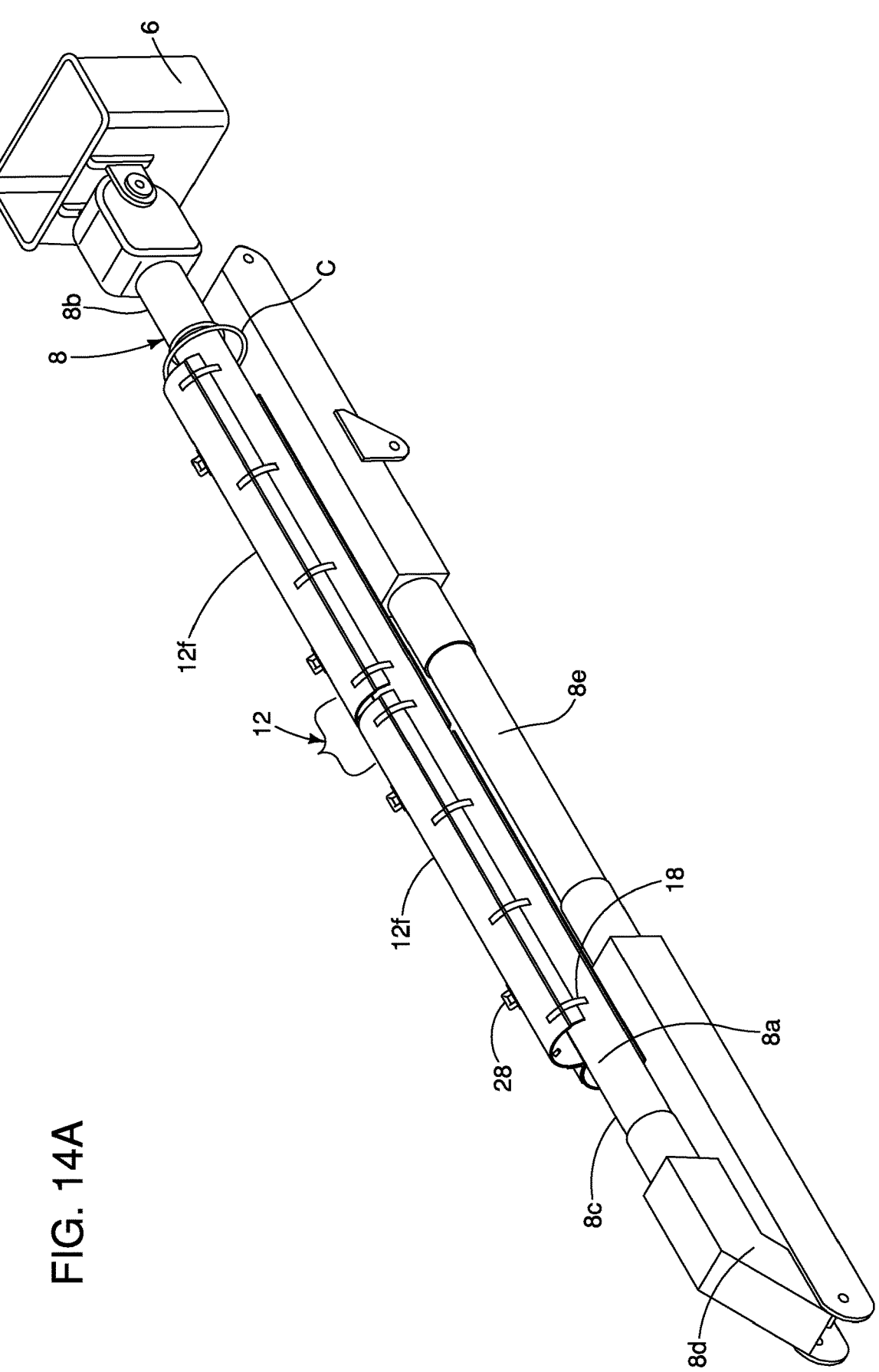
Figure 14B:
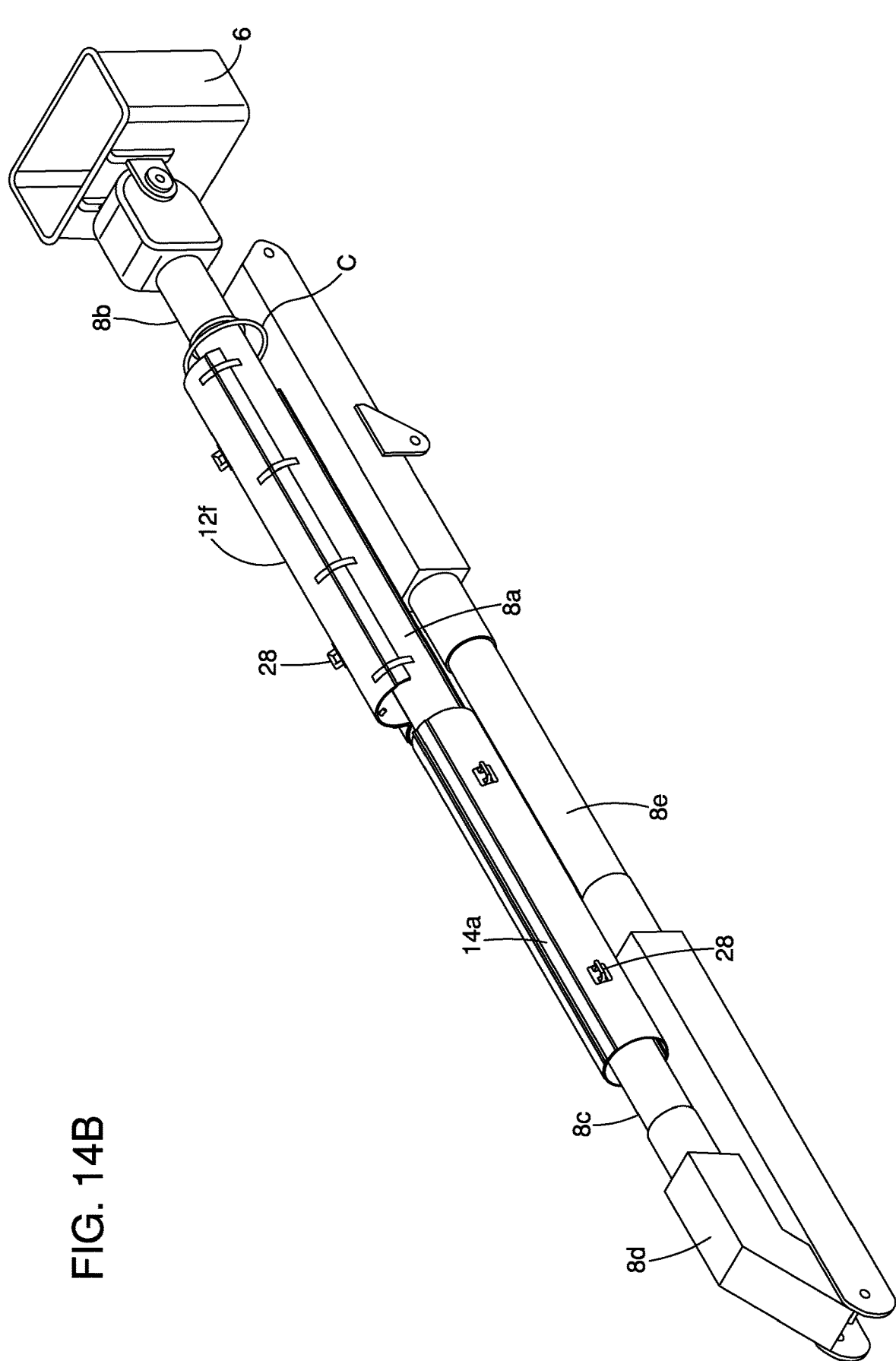
Figure 14C:
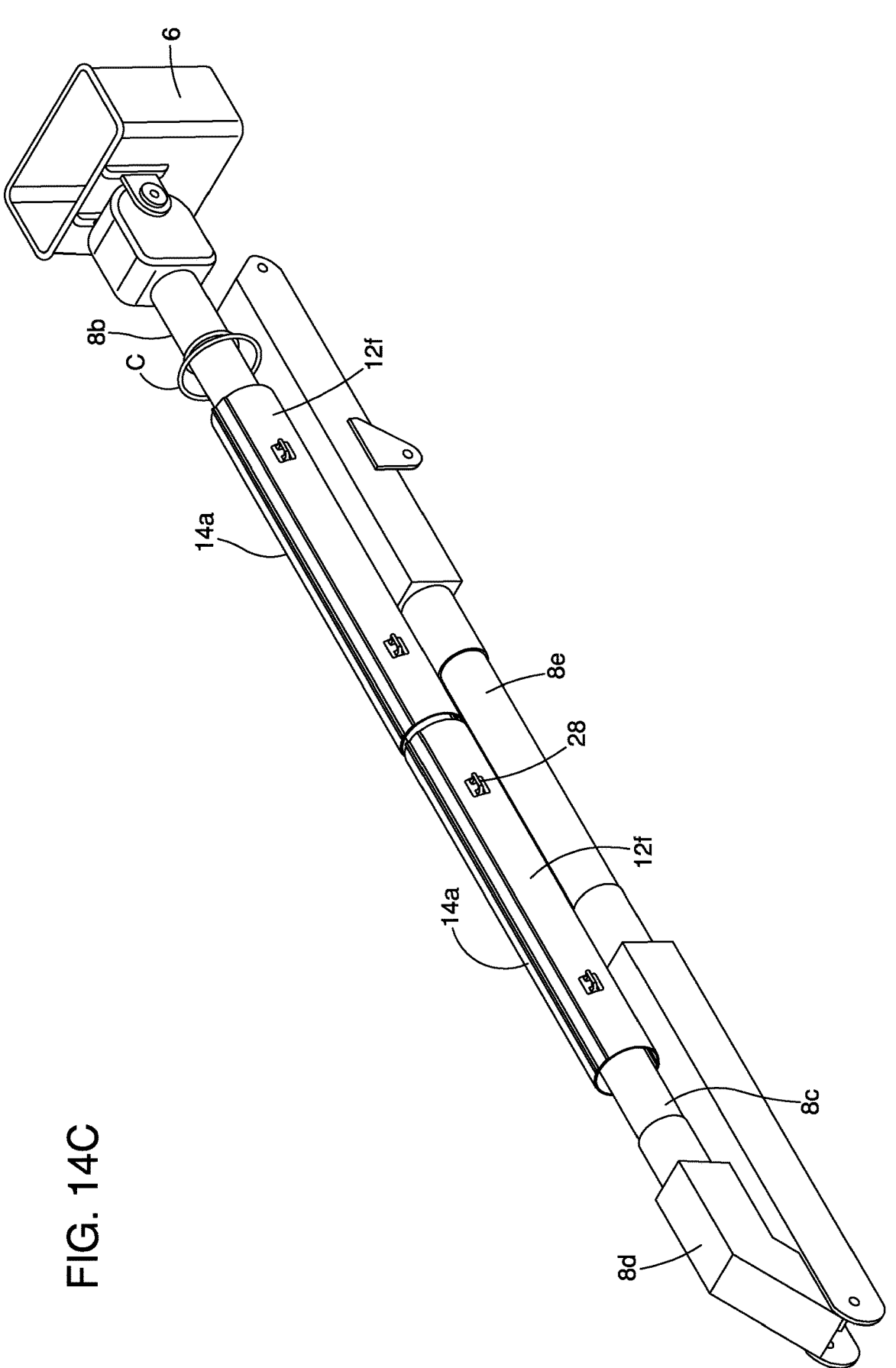
Figure 14D:
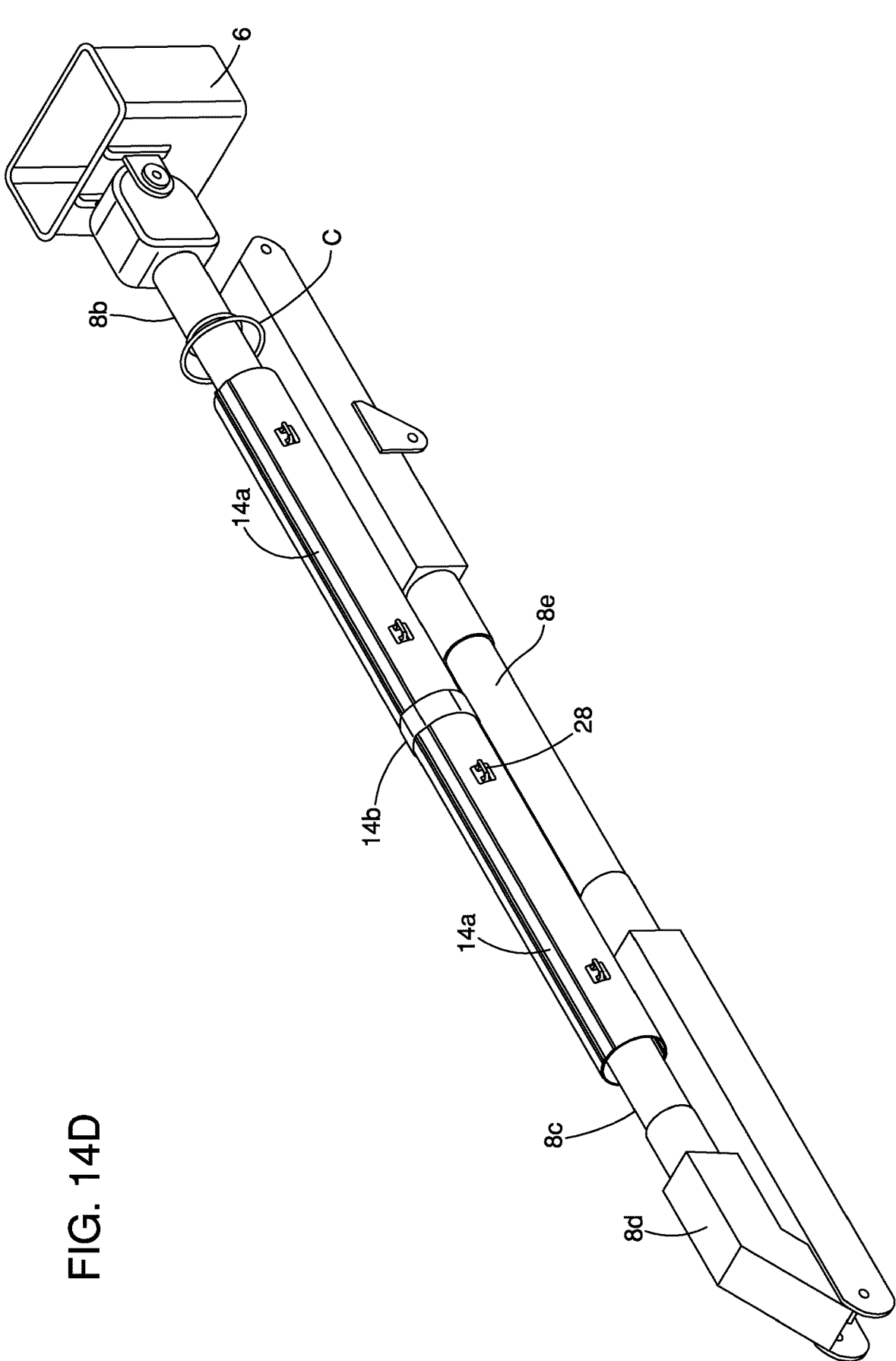
Figure 14E:
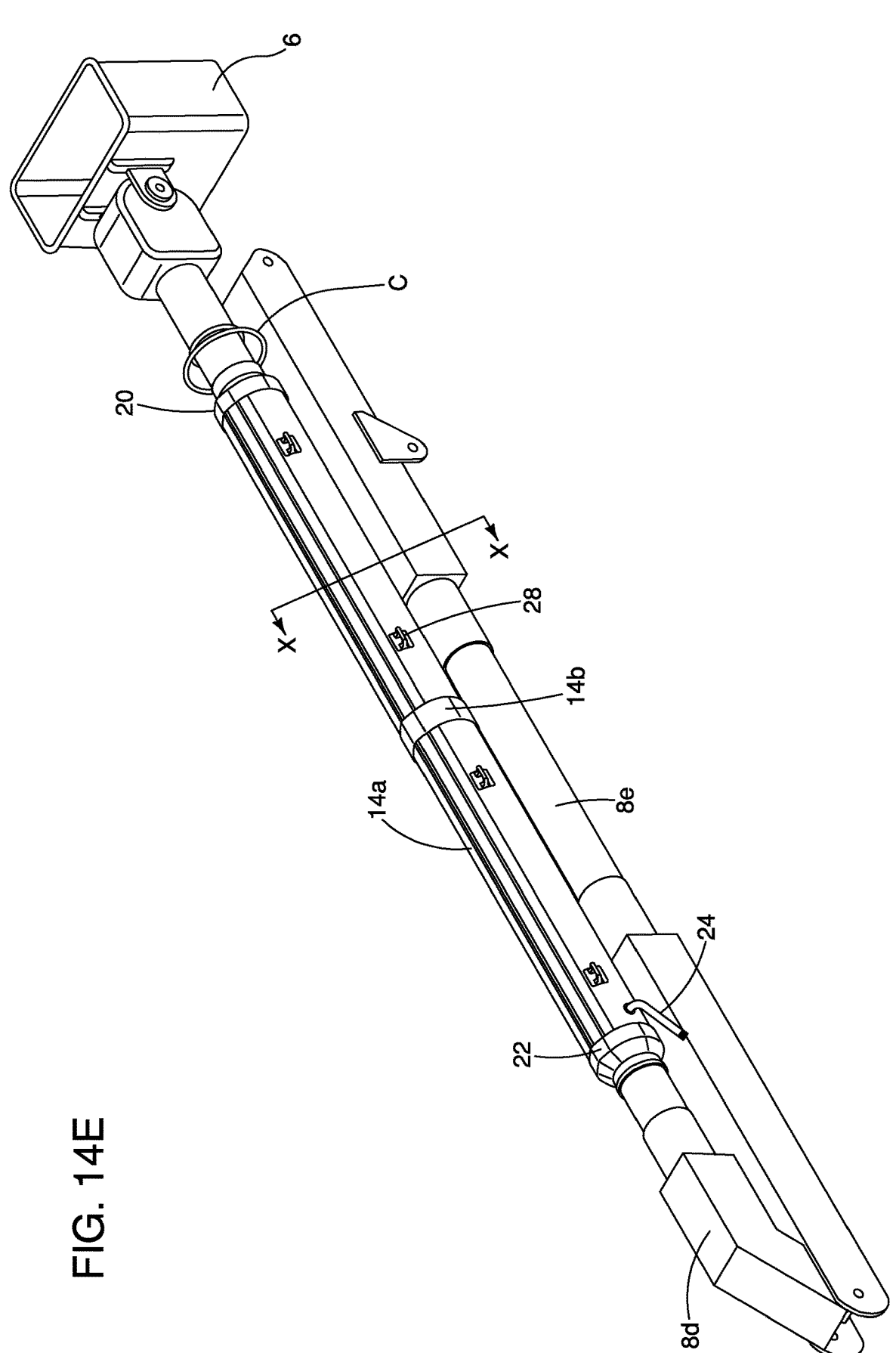
Figure 15:
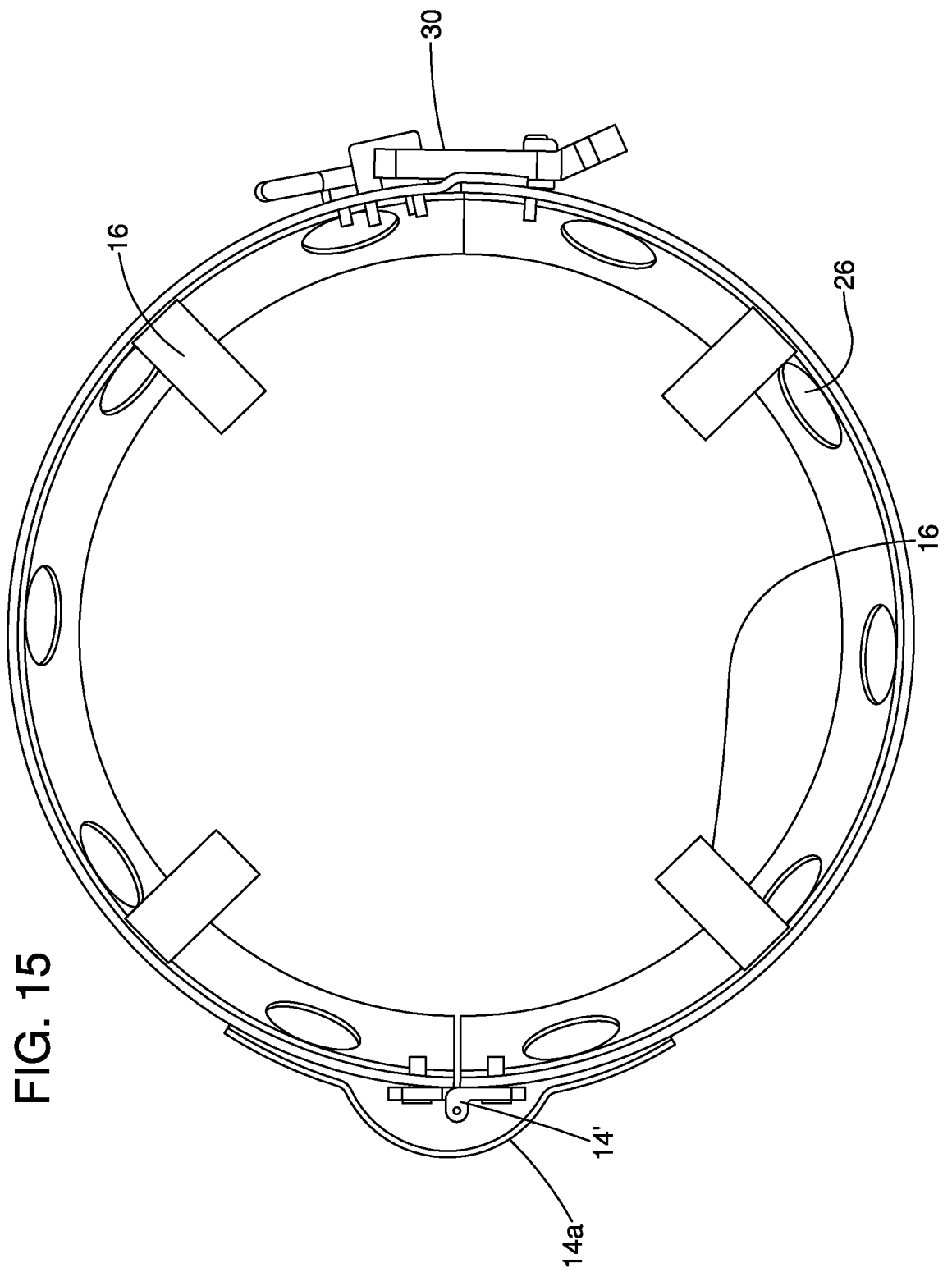
FIG. 15 is a sectional view along arrows X-X in FIG. 14E, with the insulated boom section removed.

During installation, sections 12f are located on boom exterior 8a in an end-to-end relationship, such as seen in FIG. 14A. The manner in which the two sections 12f are located on boom exterior 8a is similar to the way the boom cover 12 of FIGS. 2 to 9E is located on boom exterior 8a. With reference to FIG. 14B, after the two sections 12f are located on the boom exterior, one section is closed and secured on the boom exterior using the retaining elements 18 and 18a. The hinge 14 or 14' on the one section is sealed with the flexible cover 14a. Subsequently and with reference to FIG. 14C, the second section is then similarly closed and secured. The hinge 14 or 14' on the second section is similarly sealed. Further, the gap between the two inside and abutting ends of the two sections 12f is then covered and sealed with a joint cover 14b. The end covers 20 and 22 are then attached to the outer ends of the boom cover 12 and the inlet 24 is mounted near the end of the boom cover to which the end cover 22 is attached. As described with reference to FIGS. 2 to 9E, the system is then used for drying the boom exterior 8a while the boom 8 is in a stowed position or in a deployed position.

While the embodiments are described with reference to various implementations and exploitations, it will be understood that these embodiments are illustrative and that the scope of the inventive subject matter is not limited to them. Many variations, modifications, additions, and improvements are possible. Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. A system for drying an exterior of an electrically insulated boom section of an aerial lift device, the system comprising:

at least one boom cover adapted to be electrically insulating and disposed over the exterior of the insulated boom section to encapsulate the insulated boom section within the at least one boom cover when the at least one boom cover is disposed over the exterior of the insulated boom section;

air gap spacers spaced apart and operatively coupled to an inner surface of the at least one boom cover to space the at least one boom cover from the exterior of the insulated boom section by an air gap when the at least one boom cover is disposed over the exterior of the insulated boom section so that the air gap and an airflow passageway corresponding to the air gap completely surrounds the encapsulated insulated boom section;

retaining elements operatively coupled to the at least one boom cover to releasably retain the at least one boom cover on the exterior of the insulated boom section when the at least one boom cover is disposed over the exterior of the insulated boom section;

first and second end covers adapted to be operatively coupled to corresponding opposite distal ends of the at least one boom cover when the at least one boom cover is mounted on the insulated boom section;

an airflow inlet in fluid communication with the airflow passageway and adapted to receive air when the at least one boom cover is disposed over the exterior of the insulated boom section and to pass the air into the airflow passageway; and an airflow regulator regulating flow of the air from the airflow passageway when the at least one boom cover is mounted on the insulated boom section, wherein, in use, when the at least one boom cover is disposed, spaced, and retained on the insulated boom section, the air received by and flowing through the inlet is directed along the airflow passageway so as to flow over, along and around the exterior of the insulated boom section encapsulated within the at least one boom cover.

2. The system of claim 1, wherein the at least one boom cover has a geometry conforming to a geometry of the exterior of insulated boom section so that the at least one boom cover completely covers the insulated boom section when mounted thereon, and the air gap in the airflow passageway is consistent around and along the insulated boom section located within the at least one boom cover.

3. The system of claim 2, wherein the at least one boom cover is a single two piece boom cover, and wherein the single two piece boom cover is formed of a first half and a second half, and wherein each half is a unitary hollow half that is a mirror image of the other half, and wherein the two halves are connected to each other in an edge-to-edge relation through a hinged connection.

4. The system of claim 3 further comprising a flexible hinge cover for the hinged connection to inhibit incursion of moisture into the boom cover and escape of the air from the boom cover through the hinged connection.

5. The system of claim 1, wherein the inlet is located on the at least one boom cover or on the first or second end covers.

6. The system of claim 1, wherein the air received by the inlet is recycled air, exiting an interior of the insulated boom section after flowing through and drying the interior of the insulated boom section.

7. The system of claim 1, wherein the spacers are located on an inner surface of the at least one boom cover in a spaced apart relationship along a length of, so as to extend in a spaced array end-to-end along, the at least one boom cover.

8. The system of claim 1, wherein the spacers are rigid and formed integrally on the inner surface of the at least one boom cover.

9. The system of claim 1, wherein the spacers each have a height ranging from 1.5 inches to three inches.

10. The system of claim 1, wherein the airflow regulator includes at least one vent to control release of the air from the airflow passageway, and wherein the air reaches the vent after it has passed all along the insulated boom section located within the at least one boom cover.

11. The system of claim 10, wherein the vent comprises holes on the first or second end covers.

12. A method for drying an insulated boom section of an aerial lift device using the system of claim 1, the method comprising:

disposing and spacing the at least one boom cover on and from the exterior of the insulated boom section so as to encapsulate the insulated boom section within the at least one boom cover;

releasably retaining the at least one boom cover on the insulated boom section with the retaining elements;

operatively coupling the first and second end covers to the corresponding outer distal ends of the at least one boom cover, respectively; and directing the air through the inlet, along the airflow passageway, and onto, along and around the exterior of the insulated boom section encapsulated within the at least one boom cover to dry the exterior of the insulated boom section.

13. The method of claim 12 further comprising locating the inlet on the at least one boom cover.

14. The method of claim 12, wherein the step of disposing further comprises disposing the at least one boom cover on the exterior of the insulated boom section when the insulated boom section is in a retracted or stowed position.

15. The method of claim 12 further comprising sealing the hinged connection.

16. The method of claim 12 further comprising releasing the air in the airflow passageway from the at least one boom cover, after the drying, while regulating release of the air to the ambient through the regulator.

* * * * *